(12) United States Patent
Priya et al.

(10) Patent No.: US 12,388,680 B2
(45) Date of Patent: Aug. 12, 2025

(54) METHOD AND SYSTEM FOR PILOT DESIGN AND CHANNEL ESTIMATION IN PRESENCE OF NONLINEARITY IN THE DELAY-DOPPLER DOMAIN FOR mmWAVE OTFS SYSTEMS

(71) Applicant: THE INDIAN INSTITUTE OF TECHNOLOGY KHARAGPUR, West Bengal (IN)

(72) Inventors: Preety Priya, West Bengal (IN); Ch Santosh Reddy, West Bengal (IN); Debarati Sen, West Bengal (IN)

(73) Assignee: THE INDIAN INSTITUTE OF TECHNOLOGY KHARAGPUR, West Bengal (IN)

( * ) Notice: Subject to any disclaimer, the term of this patent is extended or adjusted under 35 U.S.C. 154(b) by 285 days.

(21) Appl. No.: 18/152,622

(22) Filed: Jan. 10, 2023

(65) Prior Publication Data

US 2023/0379194 A1    Nov. 23, 2023

(30) Foreign Application Priority Data

May 17, 2022  (IN) .............................. 202231028390

(51) Int. Cl.
| | |
|---|---|
| *H04B 17/345* | (2015.01) |
| *H04B 17/364* | (2015.01) |
| *H04L 25/02* | (2006.01) |
| *H04L 27/26* | (2006.01) |

(52) U.S. Cl.
CPC ....... *H04L 25/0224* (2013.01); *H04B 17/345* (2015.01); *H04B 17/364* (2015.01); *H04L 27/2628* (2013.01)

(58) Field of Classification Search
CPC . H04B 17/345; H04B 17/364; H04L 25/0224; H04L 27/2613; H04L 27/2628; H04L 27/2639
See application file for complete search history.

(56) References Cited

U.S. PATENT DOCUMENTS

2024/0223319 A1*  7/2024  Sun .......................... H04L 5/00

* cited by examiner

*Primary Examiner* — Melvin C Marcelo
*Assistant Examiner* — Natali Pascual Peguero
(74) *Attorney, Agent, or Firm* — MASUVALLEY & PARTNERS; Peter Martinez

(57) ABSTRACT

The present invention provides a new pilot pattern and channel estimation method involving such pilot for mmWave OTFS systems in high mobility scenarios with non-ideal power amplifier, which is applicable in the fifth generation (5G) and beyond networks. The pilot pattern for communication signal in wireless communications involving mmWave systems with non-ideal power amplifier comprises signal including a pilot signal element, information-bearing symbol and zero as guard, wherein, position of pilot and guard are arranged to combat the effect of inter symbol interference (ISI) from nonlinear impairment of the power amplifier for accurate channel estimation.

12 Claims, 6 Drawing Sheets

Figure 1:
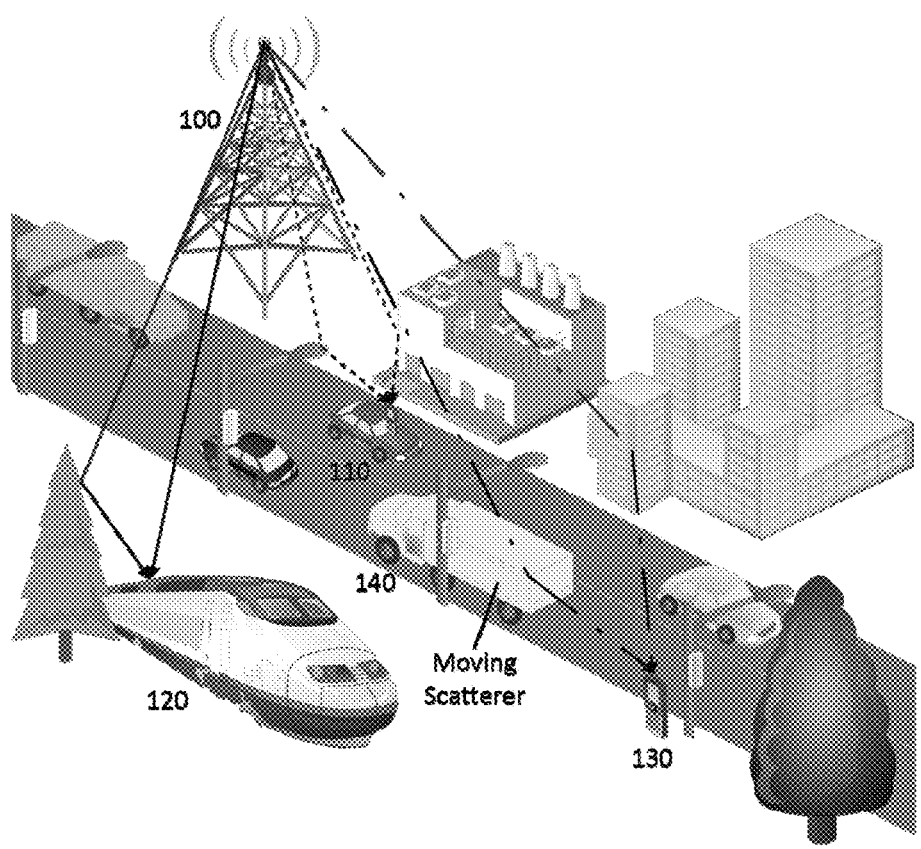

METHOD AND SYSTEM FOR PILOT DESIGN AND CHANNEL ESTIMATION IN PRESENCE OF NONLINEARITY IN THE DELAY-DOPPLER DOMAIN FOR mmWAVE OTFS SYSTEMS

CROSS-REFERENCE TO RELATED APPLICATION

This application claims priority to Indian Patent Application No. 202231028390 filed on May 17, 2022, which is hereby incorporated herein by reference in its entirety.

FIELD OF THE INVENTION

The present invention relates to wireless communications in high mobility applications. More specifically, the present invention is directed to develop a new pilot pattern and channel estimation method for millimeter wave (mmWave) systems in high mobility scenarios with non-ideal power amplifier, which is applicable in the fifth generation (5G) and beyond networks.

BACKGROUND OF THE INVENTION

To support the emerging intelligent digital society with high mobility communications, millimeter waves (mm-Waves) are envisioned to be a strong contender. However, the channel estimation which is a prerequisite of any communication systems, at such high speeds is difficult and requires large pilot overhead. To deal with, orthogonal time-frequency space (OTFS) modulation has emerged as a strong paradigm, which is resilient to the delay-Doppler shift.

The true potential of mmWave OTFS systems can be utilized with efficient pilot design and channel estimation. Existing literature have developed several channel estimator and pilot design considering the ideal behavior of power amplifier, e.g.
  [1] P. Ravitej a, K. T. Phan and Y. Hong, "Embedded pilot-aided channel estimation for OTFS in delay—Doppler channels", in IEEE Transactions on Vehicular Technology, vol. 68, no. 5, pp. 4906-4917, May 2019.
  [2] Y. Shan and F. Wang, "Low-Complexity and Low-Overhead Receiver for OTFS via Large-Scale Antenna Array," in IEEE Transactions on Vehicular Technology, vol. 70, no. 6, pp. 5703-5718, June 2021.
  [3] S. Srivastava, R. K. Singh, A. K. Jagannatham and L. Hanzo, "Bayesian Learning Aided Sparse Channel Estimation for Orthogonal Time Frequency Space Modulated Systems," in IEEE Transactions on Vehicular Technology, vol. 70, no. 8, pp. 8343-8348, Aug. 2021.
  [4] A. Pfadler and G. Jornod, "OTFS EMBEDDED PILOT ESTIMATION EXTENSION", EUROPEAN PATENT EP3826253, published on May, 2021.
  [5] Yoav Hebron et. al., "CHANNEL ACQUISITION USING ORTHOGONAL TIME FREQUENCY SPACE MODULATED PILOT SIGNALS", US PATENT US20190044682A1, published on Aug. 18, 2020.

However, it is well-known that power amplifier exhibits nonlinear response at mmWave frequency attributed to the high-frequency operation and large bandwidth. These non-linear distortions distort the pilot and induce inter-symbol interference (ISI) that destroys the guard region, resulting in erroneous estimation of channel parameters. Hence, it is mandatory to formulate a pilot pattern and channel estimation methodology assuming nonlinear behavior of power amplifier for mmWave OTFS systems to realize its practical applicability in high mobility applications.

OBJECT OF THE INVENTION

It is thus the basic object of the present invention is to develop a pilot pattern for mmWave OTFS systems which would operate involving nonlinear behavior of power amplifier to realize its practical applicability in high mobility applications.

Another object of the present invention is to develop a channel estimation method for mmWave OTFS systems which would operate involving nonlinear behavior of power amplifier to realize its practical applicability in high mobility applications.

Yet another object of the present invention is to develop a pilot pattern and channel estimation method for mmWave systems in high mobility scenarios with non-ideal power amplifier, which is applicable in the fifth generation (5G) and beyond networks.

SUMMARY OF THE INVENTION

Thus, according to the basic aspect of the present invention there is provided a pilot pattern for communication signal in wireless communications involving mmWave systems with non-ideal power amplifier comprising
  signal including a pilot signal element, information-bearing symbol and zeros as guard;
  wherein, position of said pilot signal element is selectively confined within a grid defined involving communication channel's maximum delay and Doppler index to handle the high mobility scenarios.

The present pilot pattern includes multiplicative distortion and inter symbol interference (ISI) at receiver side due to the nonlinearity, wherein selective placement of the guards facilitates removal of the ISI, while the multiplicative distortion depends on the pilot magnitude and power amplifier parameters which is known at the receiver, enabling the receiver to evaluate the amplitude and phase of the distorted pilot to carry out the channel estimation.

The present pilot pattern includes a pattern A in presence of nonlinearity formulated as $$X(l,k) = \begin{cases} d_0, \, l = l_0, k = k_0 \\ 0, \, l \in \left[l_0 - \frac{1}{2}l_{max}, l_0 + \frac{1}{2}l_{max}\right], k \in [k_0 - k_{max}, k_0 + k_{max}] \\ 0, \, l \in l_0, k \in [0, N-1], k \neq k_0 \\ d(l,k), \text{otherwise} \end{cases}$$

Where $d_0$ is the pilot, $d(l, k)$ is the information-bearing symbol, and zero is used as the guard; wherein the pilot position is confined within the grid $l_0 \in [l_{max}, M-1-l_{max}]$, $k_0 \in [2k_{max}, N-1-2k_{max}]$, here, $l_{max}$ and $k_{max}$ denote the channel's maximum delay and Doppler index and also $l=0,1, \ldots, M-1$ and $k=0,1, \ldots, N-1$; or alternative ideal pattern B in presence of nonlinearity which includes less false and miss detection of paths is $$X(l,k) = \begin{cases} d_0, \, l = l_0, k = k_0 \\ 0, \, l \in \left[l_0 - \frac{1}{2}l_{max}, l_0 + \frac{1}{2}l_{max}\right], k \in [0, N-1], k \neq k_0 \\ d(l,k), \text{otherwise} \end{cases}$$

In the present pilot patterns, the selective placement of the guards with respect to the pilots provides overhead, whereby the pilot and the guard overhead for the pattern A is $(l_{max}+1)(2k_{max}+1)+N-2k_{max}-1$ whereas the pilot and guard overhead for the ideal pattern B is $N(l_{max}+1)$, thus pattern A is spectrally more efficient than pattern B.

According to a further aspect of the present invention, there is provided a transmitter for transmitting communication signal in wireless communications involving the above pilot pattern comprising OTFS frame design block for selectively assembling complex data symbols, the pilot and the guards thus forming the OFTS frames with the pilot patterns;

Inverse Symplectic fast Fourier transform (ISFFT) block to obtain frequency-time samples $\tilde{X}$ from the OFTS frames;

Heisenberg transform modulator for further processing of the ISFFT block resultant samples to get the time domain samples s(n);

said power amplifier to amplify the time-domain samples which exhibits a nonlinear response, before releasing into the channel thus including the distortions and the ISI effect on the transmitted signal.

In the present transmitter, the Heisenberg transform modulator is implemented by passing the signal through IFFT and pulse shaping waveform; and for the rectangular pulse shaping waveform, the Heisenberg transform modulator is implemented in hardware in FPGA board involving IFFT, memory blocks, FIR filter, and parallel to serial convertors.

According to a further aspect of the present invention, there is provided a method for estimating channel for communication signal in wireless communications involving mmWave systems with non-ideal power amplifier involving the present pilot pattern comprising decoupling received signals into multiple parallel paths by analog beamforming;

performing path identification by thresholding the received signal after the analog beamforming;

converting received time-domain signal for each identified path in delay-Doppler domain;

determining Doppler shift, delay, and fading coefficient in the presence of nonlinear distortions upon determination of the existence of a path by said thresholding the received signal after beamforming;

estimating the channel coefficient incorporating the nonlinearly distorted pilot and the estimated delay and Doppler index.

In the above method, for the rectangular pulse shaping waveform, the input-output relation in the delay-Doppler domain with nonlinearity for an identified path corresponding to beamforming angle $\theta_i$ can be established as $$Y_{\theta_i}(l,k) = \begin{cases} \alpha_{\theta_i} e^{j\frac{2\pi}{MN}k_{\theta_i}(l-l_{\theta_i})} X^{\dagger}([l-l_{\theta_i}]_M, [k-k_{\theta_i}]_N) & l \in [l_{\theta_i}, M-1] \\ \frac{N-1}{N}\alpha_{\theta_i} e^{j\frac{2\pi}{MN}k_{\theta_i}(l-l_{\theta_i})} e^{-j\frac{2\pi}{N}[k-k_{\theta_i}]_N} X^{\dagger}([l-l_{\theta_i}]_M, [k-k_{\theta_i}]_N) & l \in [0, l_{\theta_i}) \end{cases}$$

wherein, $X^{\dagger}(l, k)$ is the nonlinearly distorted OTFS sample in the delay-Doppler domain which can expressed as $$X^{\dagger}(l,k) = \left[X(l,k)\frac{1}{N}\sum_{k=0}^{N-1}Y_{s(l+\check{k}M)} + \xi_{s(l+\check{k}M)}(k)\right]$$

Wherein X(l, k) is the OTFS sample in $l^{th}$ delay index and $k^{th}$ Doppler index, and $$\frac{1}{N}\sum_{\check{k}=0}^{N-1}Y_{s(l+\check{k}M)}$$

represents the multiplicative distortion, where $$Y_{s(l+\check{k}M)} = ge^{j(\Psi(|s(l+\check{k}M)|))}/\left[1+(g|s(l+\check{k}M)|/V_{sat})^{2\sigma_p}\right]^{\frac{1}{2\sigma_p}}$$

and $$\xi_{s(l+\check{k}M)}(k) = \frac{1}{N}\sum_{\check{k}=0}^{N-1}\left(Y_{s(l+\check{k}M)}\sum_{\check{p}=0,\check{p}\neq k}^{N-1}X(l,\check{p})e^{j2\pi(\check{p}-k)\check{k}/N}\right)$$

denotes the ISI from the nonlinear power amplifier; In the above method, the nonlinearly distorted pilot at the receiver can be written as $$\check{x}_0^{\dagger} = \left[d_0\frac{1}{N}\sum_{\check{k}=0}^{N-1}Y_{s(l_0+\check{k}M)} + \xi_{s(l_0+\check{k}M)}(k_0)\right]$$

The above method includes determination of the Doppler shift corresponding to an identified path and can be given by $$\hat{k}_{\theta_i} = NTv_s\cos(\theta_i)/\lambda$$

determination of the delay by scanning following region $$\mathcal{D}_{\theta_i} = \{(l,k_0+\hat{k}_{\theta_i}) | l \in [l_0, l_0+l_{max}]\}, i \in 1,\ldots,B$$

obtaining the delay index by $$\hat{l}_{\theta_i} = \arg\max_{l \in \mathcal{D}_{\theta_i}} |Y_{\theta_i}(l, k_0+\hat{k}_{\theta_i})| - l_0, i \in 1,\ldots,B;$$

and estimating the channel coefficient that incorporates the nonlinearly distorted pilot and the estimated delay and Doppler index by $$\hat{\alpha}_{\theta_i} = \frac{1}{\check{x}_0^{\dagger}}Y_{\theta_i}(l_0+\hat{l}_{\theta_i}, k_0+\hat{k}_{\theta_i})e^{-j2\pi l_0 \hat{k}_{\theta_i}/MN}$$

The above method includes FPGA board implemented Accumulators, Multipliers, COordinate Rotation DIgital Computer (CORDIC) for cosine of angle, exponential, and division calculation and comparator with memory blocks to find arg max.

According to another aspect in the present invention there is provided a receiver for implementing the method for estimating channel for communication signal in wireless communications involving mmWave systems with non-ideal power amplifier comprising antennas to receive signal $\breve{y}(n)=[\breve{y}_1(n), \ldots, \breve{y}_r(n), \ldots, \breve{y}_{N_r}(n)]^T$;

analog beamforming unit to decouple the received signals into multiple parallel paths and identify the paths by thresholding the received signals, wherein the beamforming angle corresponding to which a path exists i.e., received signal power after beamforming, is greater than a threshold value;

delay-Doppler unit for converting the received time-domain signal for each identified path, $\tilde{r}_{\theta_i}$ in the delay-Doppler domain incorporating distortion in the signal;

channel estimation unit to determine the Doppler shift, the delay, and the fading coefficient in the presence of nonlinear distortions for the converted signal for each identified path.

In the above receiver, the channel estimation unit is configured to detect presence of a pilot in the delay-Doppler domain for channel estimation based on significant distinction in the power of the distorted pilot and distorted guard and data.

BRIEF DESCRIPTION OF THE ACCOMPANYING DRAWINGS

FIG. 1: Communication scenario.

Figure 2:
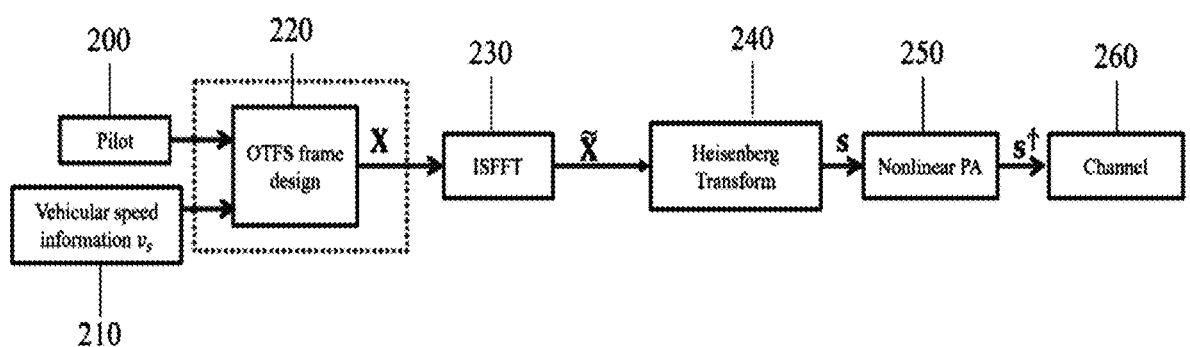

FIG. 2: OTFS transmitter with nonlinear power amplifier.

Figure 3:
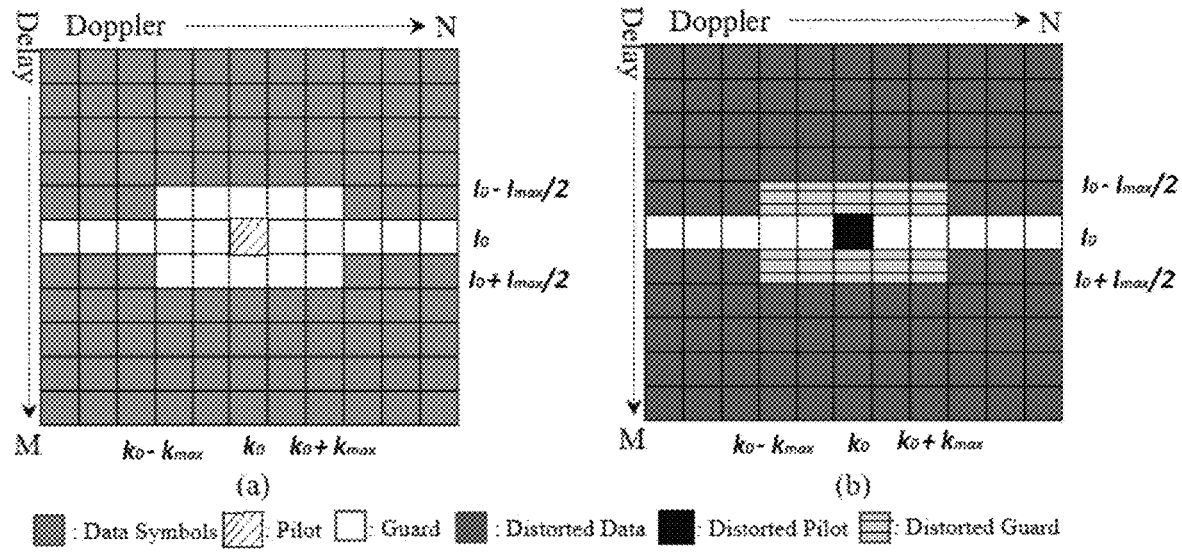

FIG. 3: Proposed spectrally efficient pilot pattern A in delay-Doppler domain (a) before power amplifier at transmitter (b) after power amplifier at receiver.

Figure 4:
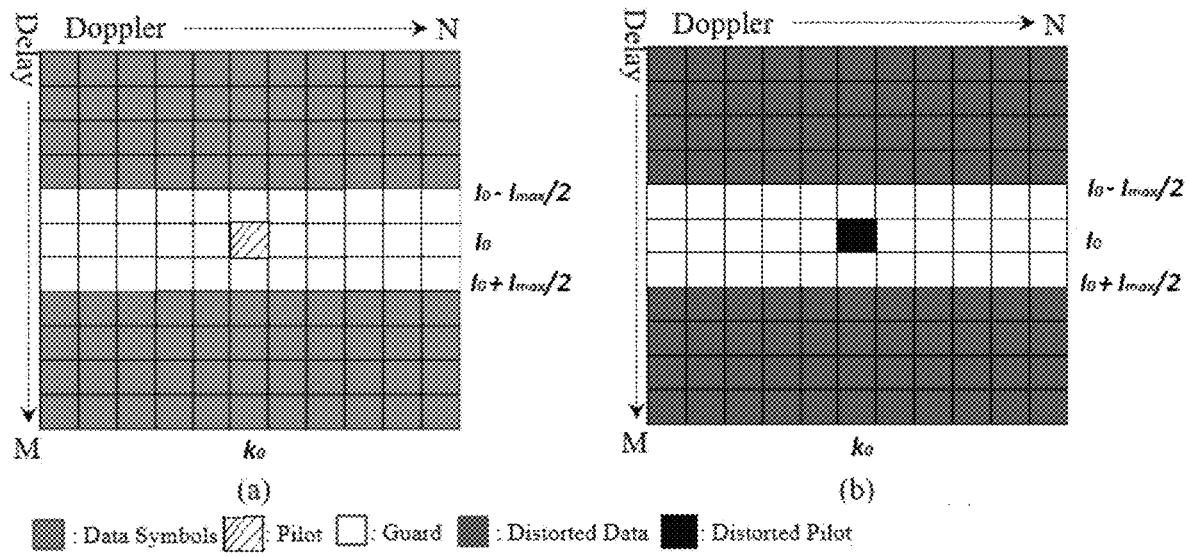

FIG. 4: Proposed ideal pilot pattern B in delay-Doppler domain (a) before power amplifier at transmitter (b) after power amplifier at receiver.

Figure 5:
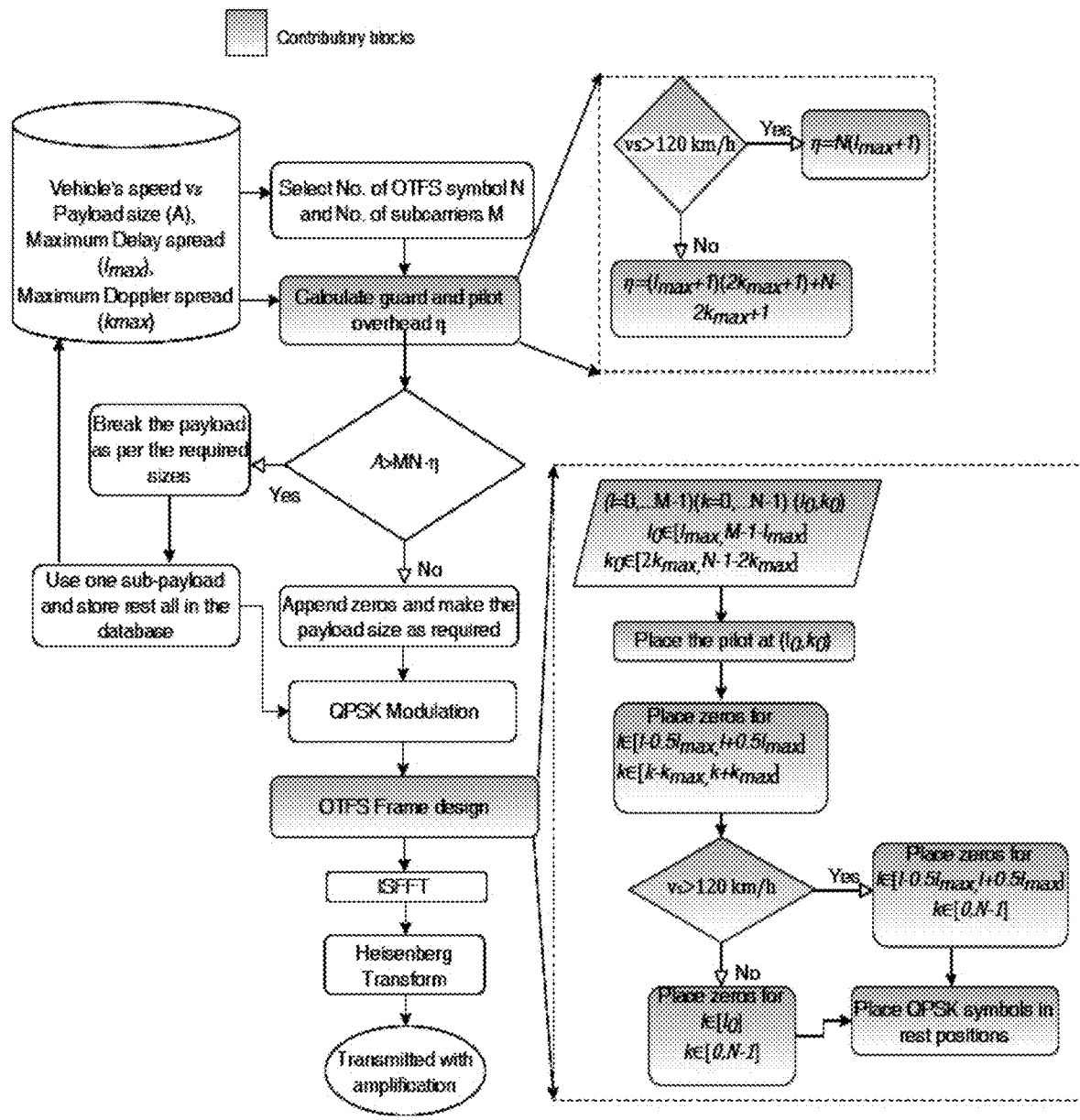

FIG. 5: Flow diagram of OTFS frame generation with proposed pilot patterns.

Figure 6:
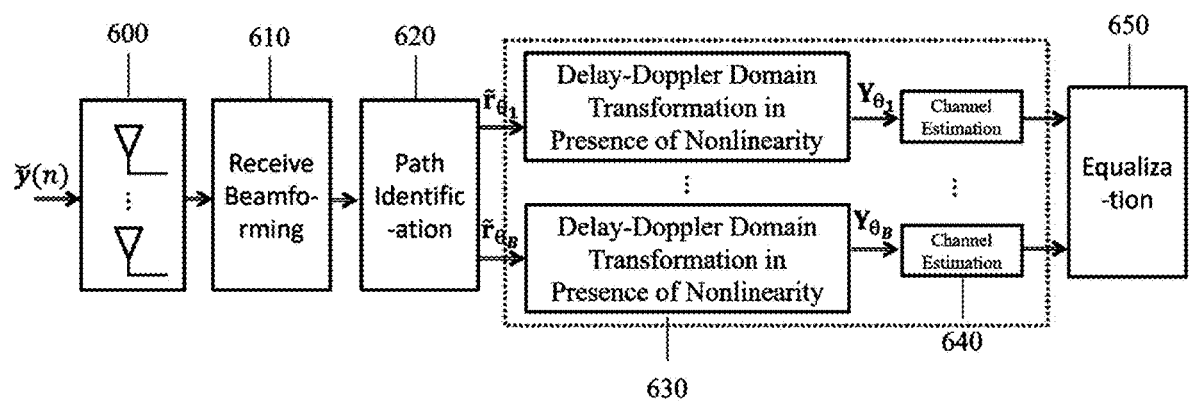

FIG. 6: Receiver with proposed channel estimation.

Figure 7:
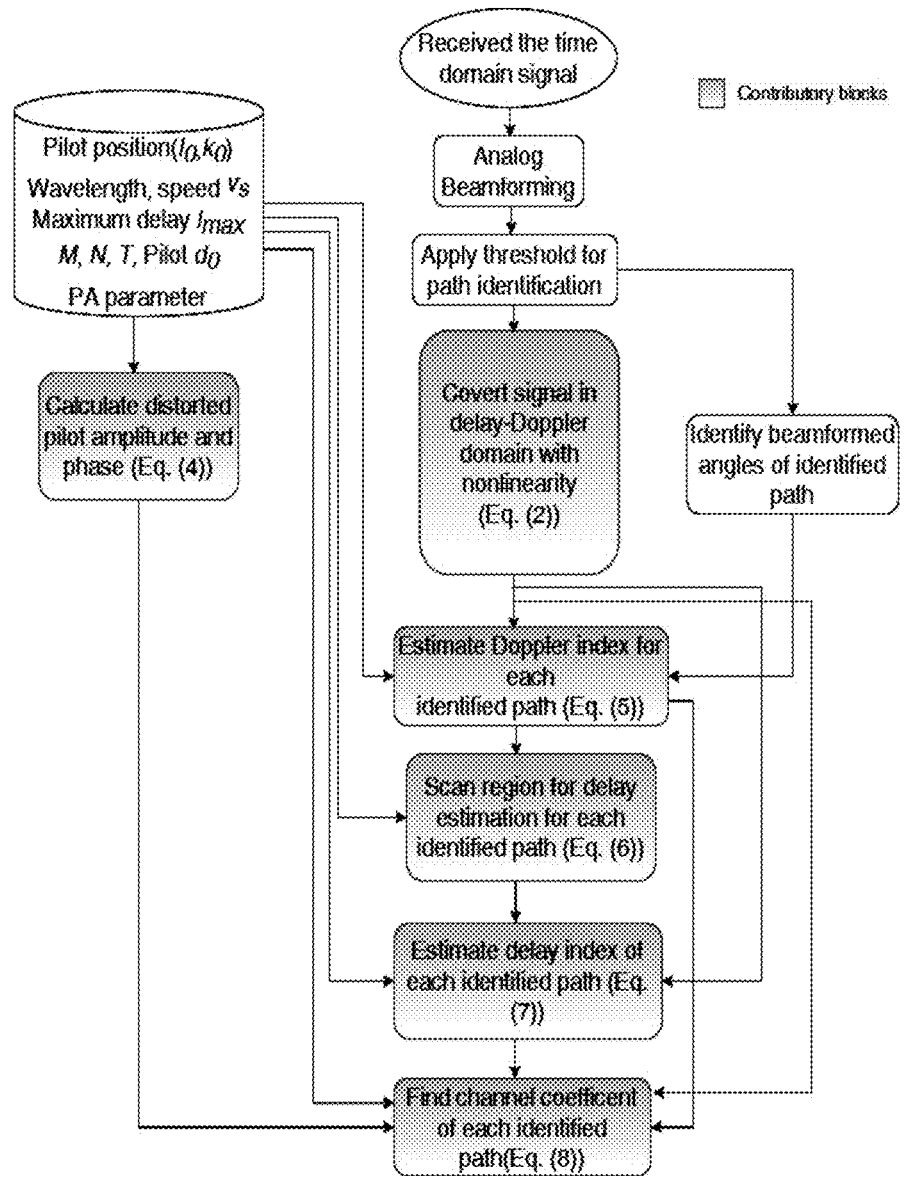

FIG. 7: Flow diagram of proposed channel estimator.

Figure 8:
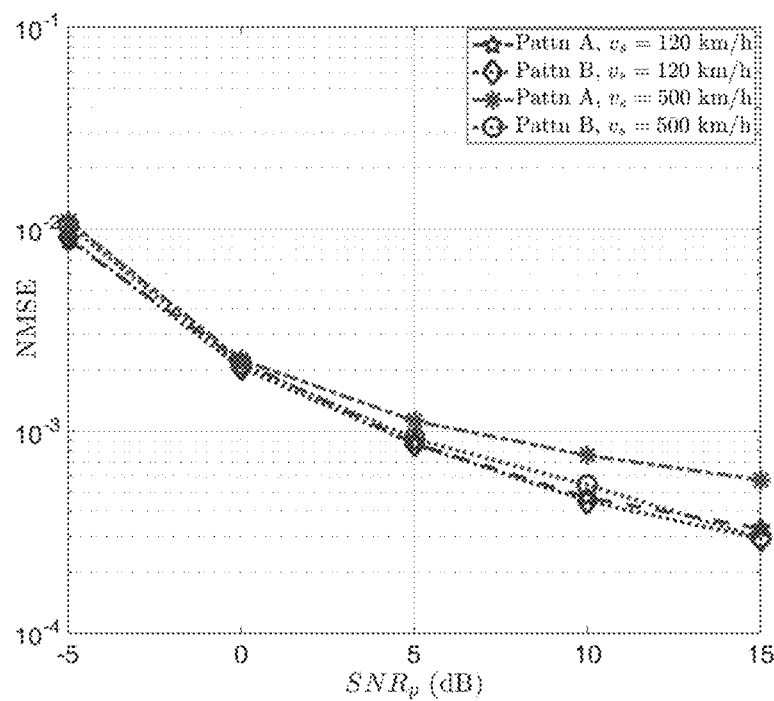

FIG. 8: NMSE vs. $SNR_p$ of the proposed channel estimator at IBO=0 dB, $N_r$=128.

Figure 9:
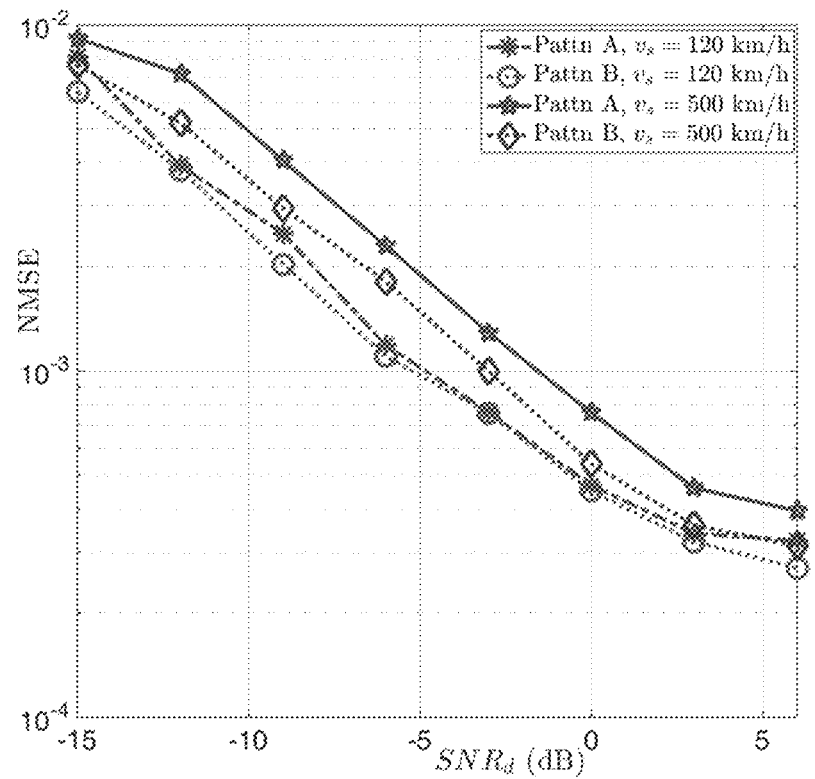

FIG. 9: NMSE vs. $SNR_d$ of the proposed channel estimator at IBO=0 dB, $N_r$=128.

DETAILED DESCRIPTION OF THE INVENTION WITH REFERENCE TO THE ACCOMPANYING DRAWINGS

As stated hereinbefore, the present invention provides a new pilot patterns and channel estimation scheme for mmWave systems in high mobility scenarios with non-ideal power amplifier, which is applicable in the fifth generation (5G) and beyond networks. Wireless applications in high mobility scenarios have become evident with the upcoming intelligent digital society. It includes many applications like intra and inter-vehicular communications in high-speed vehicles, high-speed trains, autonomous driving vehicles, etc. This high mobility induces Doppler effect where the wireless channels exhibit time selective fading. Moreover, the presence of multiple scatterers gives rise to the frequency selectivity of the channel. The currently used modulation scheme of fourth generation (4G), orthogonal frequency-division multiplexing (OFDM), can handle the frequency selectivity but is inexpedient in high mobility scenarios as it is inherently sensitive to the high Doppler effects. Recently, a new waveform design, orthogonal time-frequency space (OTFS), has been proposed in the literature to deal with the high mobility issues and is a promising upcoming modulation design.

Furthermore, mmWave frequency bands with a massive chunk of the available spectrum are a promising candidate for 5G. However, attributed to the high frequency and large bandwidth in mmWaves, the integrated circuits (ICs) in mmWaves exhibit nonlinear response and introduce nonlinear distortions in the system. One crucial component that causes nonlinearity in the communication system is the power amplifier. The nonlinear distortion distorts the pilot and guard region in OTFS systems, which results in incorrect channel estimation. Hence, to realize the benefits of fast communication, high reliability, and improved quality of services (QoS) at mmWave in high mobility applications, it is mandatory to design a proper pilot pattern that can handle the effect of nonlinear distortion for accurate channel estimation. The acquisition of channel state information is very crucial in order to retrieve the transmitted symbols in the receiver.

The present invention discloses two different pilot patterns in the delay-Doppler domain to combat the effect of ISI from the nonlinear impairment of power amplifier for the accurate channel estimation. Furthermore, the nonlinear distortion will also distort the pilot symbol, which should be incorporated in the channel estimation scheme. Hence, the present invention also discloses a new channel estimation method with the newly designed pilot pattern, which accurately estimates the high mobility channel in the delay-Doppler domain in the presence of nonlinearity. Moreover, present invention discloses about employing a receive analog beamforming and establishing an input-output relation in the delay-Doppler domain with nonlinearity, which aids in the efficient design of the channel estimator. The beamforming associated with proposed pilot patterns reduces the allocated pilot power to bring energy efficiency to the systems. The beamforming also aids in mitigating the huge path loss of mmWaves.

Communication Scenario:

FIG. 1 illustrates different communication scenarios between the base station 100 and mobile user inside a moving vehicle 110, and high-speed bullet train 120, and stationary mobile user 130 with one path coming through moving scatterer 140. Due to the multipath and user or scatterers' velocity, the received signal will experience frequency selective fading as well as Doppler shift. In the scenario of FIG. 1, let us suppose the transmitter is base station 100, and mobile user 110 is the receiver employed with a uniform linear antenna array with $N_r$ antenna elements. The information transmission is accomplished by using OTFS modulation scheme from the transmitter. The receiver receives the transmitted signal after traversing over the multipaths.

Proposed Pilot Design for Handling Nonlinearity:

FIG. 2 depicts the block diagram of the OTFS modulation scheme at the transmitter side with a nonlinear power amplifier. This disclosure has one contribution on the block 220 which is OTFS frame design. The OTFS frame 220 in the delay-Doppler domain is designed by properly placing complex data symbols, pilot 200, and guards concerning vehicular speed information 210. It is then passed through the inverse Symplectic fast Fourier transform (ISFFT) block 230 to obtain frequency-time sample $\tilde{X}$. The resultant samples are further processed through the Heisenberg transform modulator 240 to get the time domain samples s(n). The time-domain samples are amplified through the power amplifier 250 that exhibits a nonlinear response, before releasing into the physical channel 260. Due to the nonlinear power amplifier, the signal gets nonlinearly distorted.

Let an OTFS frame $X \in \mathbb{C}^{M \times N}$ consists of a pilot, guard, and complex data symbols arranged in a two-dimensional M×N delay-Doppler grid. M and N denote the number of delay samples and Doppler samples, respectively. Let A is the payload size and $v_s$ is the speed of the vehicle. The total frame duration and bandwidth of the transmitted OTFS frame are $T_f$=NT and B=M$\Delta$f, respectively, where T and $\Delta$f represent the sampling interval of time and frequency axis, respectively. We consider the case where T$\Delta$f=1, i.e., the OTFS signal is critically sampled.

The different proposed pilot pattern designs in the delay-Doppler domain, which consider the nonlinearity effect are shown in FIGS. 3(a) and 4(a). The proposed pilot pattern of FIG. 3(a) can be formulated as $$X(l,k) = \begin{cases} d_0, \; l = l_0, k = k_0 \\ 0, \; l \in \left[l_0 - \frac{1}{2}l_{max}, l_0 + \frac{1}{2}l_{max}\right], k \in [k_0 - k_{max}, k_0 + k_{max}] \\ 0, \; l \in l_0, k \in [0, N-1], k \neq k_0 \\ d(l,k), \text{ otherwise} \end{cases} \quad (1)$$

Where $d_0$ is the pilot, d(l, k) is the information-bearing symbol, and zero is used as the guard. The pilot position is confined within the grid $l_0 \in [l_{max}, M-1-l_{max}]$, $k_0 \in [2k_{max}, N-1-2k_{max}]$ for ease of representation. Here, $l_{max}$ and $k_{max}$ denote the channel's maximum delay and Doppler index. Also l=0,1, ..., M−1 and k=0,1, ..., N−1. Similarly, the expression for pilot pattern of FIG. 4(a) can be easily obtained. For ease of representation, we will denote the pilot pattern of FIGS. 3(a) and 4(a) as patterns A and B, respectively.

The distorted pilot in the receive delay-Doppler domain will be composed of multiplicative distortion and ISI due to the nonlinearity. This ISI depends on the information data which is unknown at the receiver. Subsequently, the distorted pilot at the receiver will become unknown. However, with the wise placement of guards on all the Doppler grids corresponding to pilot delay grid, will remove the ISI. Now, there will be only multiplicative distortion in the pilot. This multiplicative distortion depends on the pilot magnitude and power amplifier parameters, which is known at the receiver. Hence, the amplitude and phase of the distorted pilot can be evaluated at the receiver end to carry out the channel estimation. Further, the ISI from the nonlinear distortion distorts the guard region as well. The pilot patterns A and B after experiencing nonlinear distortion will resemble the patterns shown in FIGS. 3(b) and 4(b), respectively, in the delay-Doppler domain. Here, the delay-Doppler OTFS frame is now composed of nonlinearly distorted data, distorted pilot, and distorted guard. The distorted guard of pattern A contains the inter symbol interference (ISI) due to the nonlinear power amplifier, but their power will be small compared to the distorted data and distorted pilot. The guard region of pattern B will not be distorted due to the wise placement of nulls. Hence, it is an ideal pilot pattern in presence of nonlinearity. However, pattern A is spectrally more efficient than B. But at high speeds that give high Doppler effects, there will be false and miss detection of paths with pattern A. Hence, in such scenarios, ideal pattern B is more suitable choice. The pilot and guard overhead for the pattern A is $(l_{max}+1)(2k_{max}+1)+N-2k_{max}+1$ whereas the pilot and guard overhead for the ideal pattern B is $N(l_{max}+1)$. The flowchart of generation of OTFS frame with the proposed pilot patterns is shown in FIG. 5.

Proposed Channel Estimation

The transmitted nonlinearly distorted OTFS sample $s^{\dagger}(n)$ in $n^{th}$ time instant is represented as $$s^{\dagger}(n) = G(|s(n)|)\exp(j\Phi_{s(n)} + j\Psi)(|s(n)|)$$

Where s(n) is the time-domain OTFS sample at $n^{th}$ instant;

$$G(|s(n)|) = g|s(n)| / \left[1 + (g|s(n)|/V_{sat})^{2\sigma_p}\right]^{\frac{1}{2\sigma_p}} \text{ is}$$

the amplitude distortion defined by amplitude modulation-amplitude modulation (AM/AM) and $\Psi(|s(n)|) = \kappa|s(n)|^{\tilde{q}_1}/[1+(|s(n)|/\beta)^{\tilde{q}_2}]$ is the additional phase distortion defined by amplitude modulation-phase modulation (AM/PM), according to modified Rapp model of mmWave power amplifier. $V_{sat}$ represents the saturation voltage of power amplifier; g and $\sigma_p$ are the linear gain and smoothness factor, respectively of power amplifier. Other parameters $\kappa$, $\beta$, $\tilde{q}_1$, and $\tilde{q}_2$ are power amplifier parameters; $\Phi_{s(n)}$ denotes the phase of s(n). The degree of distortion from the power amplifier is defined by input back off (IBO) which is expressed as $$-10 \log_{10}\left(\frac{p_i}{p_{sat}}\right),$$

where $p_i$ is input signal power to power amplifier and $p_{sat}$ is saturation power. Lower IBO constitutes a higher nonlinear distortion from the power amplifier.

FIG. 6 shows the block diagram of the receiver with proposed channel estimation where this disclosure has the contributions in the block 630-640. The received signal $\breve{y}(n) = [\breve{y}_1(n), \ldots, \breve{y}_r(n), \ldots, \breve{y}_{N_r}(n)]^T$, where $\breve{y}_r(n)$ is the signal received at $r^{th}$ receive antenna 600, passes through the receive analog beamforming 610 that decouples the received signal into multiple parallel paths. The path identification 620 can be performed by thresholding the received signal after analog beamforming. Let $\theta_i$, where i=1,2, ..., B denote the beamforming angles corresponding to which a path exists i.e., received signal power after beamforming is greater than a threshold value. Further, corresponding to an identified path with beamforming angle $\theta_i$, let the Doppler index is $k_{\theta_i}$, delay index is $l_{\theta_i}$, and complex gain of the channel is $\alpha_{\theta_i}$.

The received time-domain signal after beamforming for each identified path, $\tilde{r}_{\theta_i}$ is then converted in the delay-Doppler domain 630, where it is nonlinearly distorted. For the rectangular pulse shaping waveform, the input-output relation in the delay-Doppler domain with nonlinearity for an identified path corresponding to beamforming angle $\theta_i$ can be established as $$Y_{\theta_i}(l,k) = \begin{cases} \alpha_{\theta_i} e^{j\frac{2\pi}{MN}k_{\theta_i}(l-l_{\theta_i})} X^{\dagger}([l-l_{\theta_i}]_M, [k-k_{\theta_i}]_N) & l \in [l_{\theta_i}, M-1] \\ \frac{N-1}{N}\alpha_{\theta_i} e^{j\frac{2\pi}{MN}k_{\theta_i}(l-l_{\theta_i})} e^{-j\frac{2\pi}{N}[k-k_{\theta_i}]_N} X^{\dagger}([l-l_{\theta_i}]_M, [k-k_{\theta_i}]_N) & l \in [0, l_{\theta_i}) \end{cases} \quad (2)$$

Here, $X^{\dagger}(l, k)$ is the nonlinearly distorted OTFS sample in the delay-Doppler domain which can expressed as $$X^{\dagger}(l, k) = \left[X(l, k) \frac{1}{N} \sum_{\breve{k}=0}^{N-1} Y_{s(l+\breve{k}M)} + \xi_{s(l+\breve{k}M)}(k)\right] \quad (3)$$

Where $X(l, k)$ is the OTFS sample in $l^{th}$ delay index and $k^{th}$ Doppler index, and $$\frac{1}{N} \sum_{\breve{k}=0}^{N-1} Y_{s(l+\breve{k}M)}$$

represents the multiplicative distortion, where $$Y_{s(l+\breve{k}M)} = g e^{j\left(\Psi\left(|s(l+\breve{k}M)|\right)\right)} / \left[1 + \left(g|s(l+\breve{k}M)|/V_{sat}\right)^{2\sigma_p}\right]^{\frac{1}{2\sigma_p}}$$

and $$\xi_{s(l+\breve{k}M)}(k) = \frac{1}{N} \sum_{\breve{k}=0}^{N-1} \left(Y_{s(l+\breve{k}M)} \sum_{\breve{p}=0, \breve{p}\neq k}^{N-1} X(l, \breve{p}) e^{j2\pi(\breve{p}-k)\breve{k}/N}\right)$$

denotes the ISI from the nonlinear power amplifier. Note that, additive white Gaussian noise (AWGN) that is independent and identically distributed (i.i.d) complex random variable with zero mean and variance $\sigma_v^2$ is omitted in (2) for brevity.

The proposed channel estimation 640 will determine the Doppler shift, the delay, and the fading coefficient in the presence of nonlinear distortions. Firstly, the existence of a path is determined by thresholding the received signal after beamforming. Then, the estimation of Doppler, delay shift, and fading coefficient will be established.

Following (3), the expression of the nonlinearly distorted pilot can be written as $$d_n^{\dagger} = \left[d_0 \frac{1}{N} \sum_{\breve{k}=0}^{N-1} Y_{s(l_0+\breve{k}M)} + \xi_{s(l_0+\breve{k}M)}(k_0)\right] \quad 4$$

From (4), one can observe that the distorted pilot contains additional multiplicative distortion and ISI which is unknown (since these terms depend upon the data symbols). Hence, the distorted pilot is unknown to the receiver, and the channel estimation could not proceed. However, with the proposed pilot patterns A and B, where zeros are placed in all the Doppler grids corresponding to pilot position delay index $l_0$, the ISI does not exist, and the amplitude and phase of the distorted pilot can be calculated at the receiver.

Note that in pilot pattern A, due to the placement of all zeros from k=0: N−1, k≠$k_0$, at delay index $l_0$, the power of the received nonlinearly distorted pilot in the delay-Doppler domain will be high as compared to the power of the distorted data symbols or distorted guard symbols. The received distorted pilot will not have any ISI with pilot pattern A and the level of severity in multiplicative distortion will also be less. Hence, the power amplifier will mainly boost the power of the received pilot. In contrast, the data and guard will experience multiplicative distortions and ISI due to the nonlinear power amplifier. These multiplicative distortions and ISI lead to a reduction in the power of the nonlinearly distorted data and distorted guard as ISI may result in destructive interference. Hence, a significant distinction in the power of the distorted pilot and distorted guard and data can be observed. This distinction in the power level can be utilized to establish the presence of a pilot in the delay-Doppler domain for channel estimation, even when low power is allocated to the pilot. Similar arguments follow for the pilot pattern B. Moreover, the guard symbols of ideal pilot pattern B do not get affected due to the nonlinear power amplifier. Hence, the proposed pilot pattern and channel estimation in the presence of nonlinearity can achieve reliable communication.

The determination of the Doppler shift corresponding to an identified path can be given by $$\hat{k}_{\theta_i} = NTv_s \cos(\theta_i)/\lambda \ldots \quad 5$$

The estimation of the delay can be accomplished by scanning the following region $$\mathcal{D}_{\theta_i} = \{(l, k_0 + \hat{k}_{\theta_i}) | l \in [l_0, l_0 + l_{max}]\}, i \in 1, \ldots, B \ldots \quad 6$$

and the delay index estimate is obtained by $$\hat{l}_{\theta_i} = \arg \max_{l \in \mathcal{D}_{\theta_i}} |Y_{\theta_i}(l, k_0 + \hat{k}_{\theta_i})| - l_0, i \in 1, \ldots, B \quad 7$$

Finally, the estimate of the channel coefficient incorporates the nonlinearly distorted pilot and can be given for the estimated delay and Doppler index by $$\hat{a}_{\theta_i} = \frac{1}{d_n^{\dagger}} Y_{\theta_i}(l_0 - \hat{l}_{\theta_i}, k_0 + \hat{k}_{\theta_i}) e^{-j2\pi l_0 \hat{k}_{\theta_i}/MN} \quad 8$$

The estimated channel can be used for equalization 650 in order to retrieve the information symbols.

Results

For testing, OTFS symbols of N=128 and subcarriers M=128 is considered. The carrier frequency is centered at 28 GHz and subcarrier spacing is 200 kHz. Further, we adopted the Urban Microcell (UMi) street canyon channel model, simulated according to the tapped delay line (TDL)-B model of 3GPP [3GPP TR 38.900: Study on channel model for frequency spectrum above 6 GHz." Tech. Rep] in the NLOS scenario with a delay spread of 66 ns. The nonlinear power amplifier model proposed by IEEE 802.11ad TG [E. Perahia et al., "IEEE P802.11 Wireless LANs TGad Evaluation Methodology," IEEE, vol. 802, pp. 3-5, 2010] is considered to model the nonlinearity of mmWave power amplifier. We define the signal-to-noise ratio (SNR) of the data symbols as $$SNR_d = \frac{E\{|X^{\dagger}|^2\}}{\sigma_v^2}$$

and SNR of the pilot as $$SNR_p = \frac{d_n^{\dagger}}{\sigma_v^2}.$$

The performance of the proposed channel estimator with the different proposed pilot patterns at 0 dB IBO over the mmWave NLOS UMi channel is evaluated in FIG. 8. The different speeds are taken as $v_s$=120 km/hr and 500 km/hr which corresponds to a maximum Doppler frequency of 3.11 kHz and 12.96 kHz respectively. The value of $SNR_d$ is set to 0 dB. It can be observed from the figure that the normalized mean square error (NMSE) of the estimator falls with increasing $SNR_p$ for both the patterns and at all speeds. This is attributed to the enhancement in the pilot power with increase in $SNR_p$. The figure also depicts that the performance of the proposed estimator degrades by 2 dB to attain NMSE $10^{-3}$ at speed of 500 km/hr as compared to speed of 120 km/hr with pilot pattern A. This is due to the fact that the Doppler effect is large at higher speeds and the spectral efficient pattern A results in false and miss detection of the paths due the distortion in the guard region attributed to the nonlinearity. However, the ideal pattern B shows improved performance by 1.5 dB as compared to pattern A at speed of 500 km/hr. Here, the guard regions are not distorted due to the nonlinearity. Hence, ideal pattern B is more suitable for channel estimation at higher speeds.

FIG. 9 shows the NMSE vs $SNR_d$ of the proposed channel estimator with the different proposed pilot patterns at 0 dB IBO over the mmWave NLOS UMi channel. The speed is taken as 120 km/hr and 500 km/hr, and $SNR_p$ is set to 10 dB. The allocation of low $SNR_p$ to the pilot is attributed to the receive beamforming gain and the proposed pilot design. The NMSE falls with increasing $SNR_d$ for both pilot patterns and at all speeds. Further, we can observe that the NMSE of the estimator degrades by 3 dB $SNR_d$ to achieve NMSE $10^{-3}$ with pilot pattern A when speed increases from 120 km/hr to 500 km/hr. This is owing to the distortion of guard region, which in turn increases the miss and false detection of paths for high Doppler effect attributed to high speeds. However, the ideal pattern B, where guards do not get affected by the nonlinear distortions, shows improved performance even at a speed of 500 km/hr.

The advantages of the present invention can be summarized as hereunder:

i. The present invention considered a practical non-ideal power amplifier for mmWave systems in high mobility applications.
ii. OTFS is employed to deal with the high mobility of channel, which is known to be resilient to the delay-Doppler shifts. Hence, the proposed framework is suitable for establishing communications link operating in mmWave frequency band under high mobility scenarios.
iii. A method of pilot pattern design in delay-Doppler domain that considered the effect of nonlinearity for mmWave OTFS systems in high mobility is presented.
iv. A method of channel estimation in delay-Doppler domain that incorporates the distortion in the estimation process in association with beamforming, enhanced the channel acquisition in presence of nonlinearity.
v. Method of establishing expression of nonlinearly distorted pilot in delay-Doppler domain, which aids in pilot pattern design.
vi. Establishment of input-output relation in the delay-Doppler domain with nonlinearity in association with beamforming, aids channel estimation.
vii. Large antenna array is deployed at the receiver, which is used for analog beamforming to mitigate the large path loss in mmWave.
viii. With the beamforming and proposed pilot design, the pilot power is optimized.
ix. The proposed methodology is spectrally more efficient compared to digital predistorter (DPD) as the latter requires five times bandwidth of the transmitted signal, which is massive for mmWave systems employed to achieve high data rate.
x. The invention can be utilized in equalization in high-speed applications employed with mmWave like inter and intra vehicular communications, high-speed railways, mmWave IoT systems, UAV systems in mmWave, cellular communication in 5G, etc., to achieve reliable communication.

The invention claimed is:

1. A method for estimating channel for communication signal in wireless communications involving mm Wave systems with non-ideal power amplifier and high mobility involving a pilot pattern comprising: transmitting a signal including a pilot signal element, information-bearing symbol and zero as guard; wherein, position of said pilot signal element is selectively confined within a grid defined involving communication channel's maximum delay and Doppler index to handle the high mobility scenario; said pilot pattern further includes multiplicative distortion and inter symbol interference (ISI) at receiver side due to nonlinearity, whereby selective placement of the guards facilitates removal of the ISI, while the multiplicative distortion depends on the pilot magnitude and power amplifier parameters which is known at the receiver, enabling the receiver to evaluate the amplitude and phase of the distorted pilot to carry out channel estimation.

2. The method as claimed in claim 1, wherein the pilot pattern includes a pattern A formulated as $$X(l, k) = \begin{cases} d_0, l = l_0, k = k_0 \\ 0, l \in \left[l_0 - \frac{1}{2}l_{max}, l_0 + \frac{1}{2}l_{max}\right], k \in [k_0 - k_{max}, k_0 + k_{max}] \\ 0, l \in l_0, k \in [0, N-1], k \neq k_0 \\ d(l, k), \text{otherwise} \end{cases},$$

Where do is the pilot, d(l, k) is the information-bearing symbol, and zero is used as the guard; wherein the pilot position is confined within the grid $l_0 E$ [lmax, M−1−'max], koC [$^2$kmax, N−1 −$^2$kmax], here, lmax and kmax denote the channel's maximum delay and Doppler index and also l=0,1, - - - , M−1 and k=0,1, - - - , N−1; or an alternative ideal pattern B which includes less false and miss detection of paths is $$X(l, k) = \begin{cases} d_0, l = l_0, k = k_0 \\ 0, l \in \left[l_0 - \frac{1}{2}l_{max}, l_0 + \frac{1}{2}l_{max}\right], k \in [0, N-1]k \neq k_0 \\ d(l, k), \text{otherwise} \end{cases}.$$

3. The method as claimed in claim 2, wherein the selective placement of the guards with respect to the pilots provides overhead, whereby the pilot and the guard overhead for the pattern A is$(l_{max}+1)(2k_{max}+1)+N-2k_{max}+1$ whereas the pilot and guard overhead for the ideal pattern B is $N(l_{max}+1)$, thus pattern A is spectrally more efficient than pattern B.

4. A transmitter for transmitting communication signal in wireless communications involving the method as claimed in claim 3, further comprising: OTFS frame design block for selectively assembling complex data symbols, the pilot and the guards thus forming the OTFS frames with the pilot patterns; Inverse Symplectic fast Fourier transform (ISFFT) block to obtain frequency-time samples X from the OTFS frames; Heisenberg transform modulator for further processing the ISFFT block resultant samples to get the time domain samples s (n);said power amplifier to amplify the time-domain samples which exhibits a nonlinear response, before releasing into the channel thus including the distortions and ISI effect on the transmitted signal.

5. The transmitter as claimed in claim 4, wherein the Heisenberg transform modulator is implemented by passing the signal through IFFT and pulse shaping waveform; and for the rectangular pulse shaping waveform, the Heisenberg transform modulator is implemented in hardware in FPGA board involving IFFT, memory blocks, FIR filter, and parallel to serial convertors.

6. The method for estimating channel for communication signal in wireless communications involving mmWave systems with non-ideal power amplifier involving the pilot pattern as claimed in claim 2, further comprising: decoupling received signals into multiple parallel paths by analog beamforming; performing path identification by thresholding the received signal after the analog beamforming; converting received time-domain signal for each identified path in delay-Doppler domain; determining Doppler shift, delay, and fading coefficient in the presence of nonlinear distortions upon determination of the existence of a path by said thresholding the received signal after beamforming; estimating the channel coefficient incorporating the nonlinearly distorted pilot and the estimated delay and Doppler index.

7. The method as claimed in claim 6, wherein for the rectangular pulse shaping waveform, the input-output relation in the delay-Doppler domain with nonlinearity for an identified path corresponding to beamforming angle $\theta_i$ can be established as $$Y_{\theta_i}(l,k) = \begin{cases} \alpha_{\theta_i} e^{j\frac{2\pi}{MN}k_{\theta_i}} X^{\dagger}([l-l_{\theta_i}]_M, [k-k_{\theta_i}]_N) & l \in [l_{\theta_i}, M-1] \\ \frac{N-1}{N}\alpha_{\theta_i} e^{j\frac{2\pi}{MN}k_{\theta_i}(l-l_{\theta_i})} e^{-j\frac{2\pi}{MN}k_{\theta_i}[k-k_{\theta_i}]_N} X^{\dagger}([l-l_{\theta_i}]_M, [k-k_{\theta_i}]_N) & l \in [0, l_{\theta_i}) \end{cases}$$

wherein, $X\Psi(l,k)$ is the nonlinearly distorted OTFS sample in the delay-Doppler domain which can expressed as $$X^{\dagger}(l,k) = \left[X(l,k)\frac{1}{N}\sum_{k=0}^{N-1} Y_{s(l+\breve{k}M)} + \xi_{s(l+\breve{k}M)}(k)\right]$$

wherein X(l,k) is the OTFS sample in $l^{th}$ delay index and $k^{th}$ Doppler index, and $$\frac{1}{N}\sum_{\breve{k}=0}^{N-1} Y_{s(l+\breve{k}M)}$$

represents the multiplicative distortion, where $$Y_{s(l+\breve{k}M)} = g e^{j\left(\Psi\left(|s(l+\breve{k}M)|\right)\right)} / \left[1 + \left(g|s(l+\breve{k}M)|/V_{sat}\right)^{2\sigma_p}\right]^{\frac{1}{2\sigma_p}}$$

and $$\xi_{s(l+\breve{k}M)}(k) = \frac{1}{N}\sum_{\breve{k}=0}^{N-1}\left(Y_{s(l+\breve{k}M)}\sum_{\breve{p}=0,\breve{p}\neq k}^{N-1} X(l,\breve{p})e^{j2\pi(\breve{p}-k)\breve{k}/N}\right)$$

denotes the ISI from the nonlinear power amplifier.

8. The method as claimed in claim 6 wherein, the non-linearly distorted pilot at the receiver can be written as $$i_n^{\dagger} = \left[d_0 \frac{1}{N}\sum_{k=0}^{N-1} Y_{s(l_0+\breve{k}M)} + \xi_{s(l_0+\breve{k}M)}(k_0)\right].$$

9. The method as claimed in claim 6, includes determination of the Doppler shift corresponding to an identified path and can be given by $$\hat{k}_{\theta_i} = NTv_s \cos(\theta_i)/\lambda$$

determination of the delay by scanning following region $$\mathcal{D}_{\theta_i} = \{(l,k_0+\hat{k}_{\theta_i})|l \in [l_0,l_0+l_{max}]\}, i \in 1, \ldots, B$$

obtaining the delay index by $$\hat{l}_{\theta_i} = \arg\max_{l \in \mathcal{D}_{\theta_i}} |Y_{\theta_i}(l, k_0 + \hat{k}_{\theta_i})| - l_0, i \in 1, \ldots, B;$$

and estimating the channel coefficient that incorporates the nonlinearly distorted pilot and the estimated delay and Doppler index by $$\hat{a}_{\theta_i} = \frac{1}{i_n^{\dagger}} Y_{\theta_i}(l_0 - \hat{l}_{\theta_i}, k_0 + \hat{k}_{\theta_i}) e^{-j2\pi l_0 \hat{k}_{\theta_i}/MN}.$$

10. The method as claimed in claim 6, includes FPGA board implemented Accumulators, Multipliers, COordinate Rotation Digital Computer (CORDIC) for cosine of angle, exponential, and division calculation and comparator with memory blocks to find arg max.

11. A receiver for implementing the method for estimating channel for communication signal in wireless communications involving mm Wave systems with non-ideal power amplifier as claimed in claim 7, further comprising: antennas to receive signal $f(n)=[f_1(n), \ldots, \breve{y}_r(n), \ldots, \breve{y}_{N_r}(n)]^T$ analog beamforming unit to decouple the received signals into multiple parallel paths and identify the paths by thresholding the received signals, wherein the beamforming angle corresponding to which a path exists i.e., received signal power after beamforming, is greater than a threshold value; delay-Doppler unit for converting the received time-domain signal for each identified path, "s in the delay-Doppler domain incorporating distortion in the signal; channel estimation unit to determine the Doppler shift, the delay, and the fading coefficient in the presence of nonlinear distortions for the converted signal for each identified path.

12. The receiver as claimed in claim 11, wherein the channel estimation unit is configured to detect presence of a pilot in the delay-Doppler domain for channel estimation based on significant distinction in the power of the distorted pilot and distorted guard and data.

* * * * *